Feb. 28, 1928.　　　　　　　　　　　　　　　　　　　　　1,660,537
C. WASKOM
HANDLE FOR SCREW DRIVERS OR SIMILAR TOOLS
Filed Dec. 13, 1922
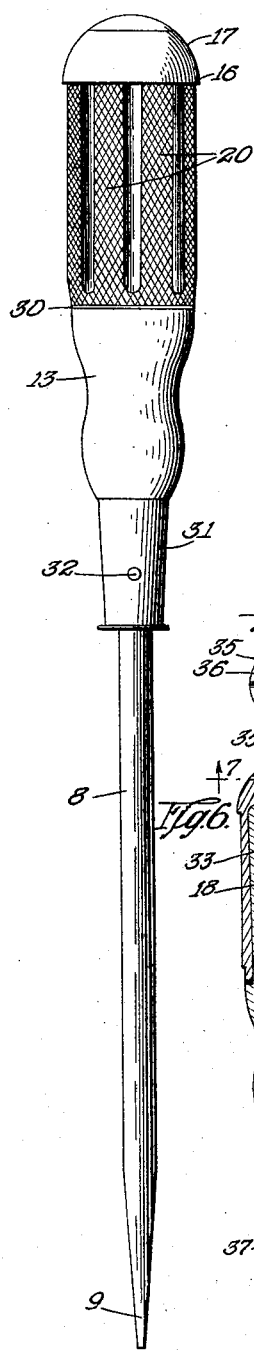
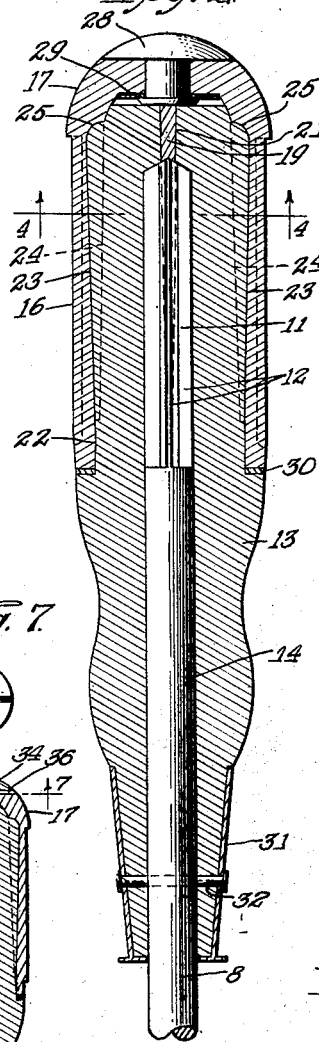
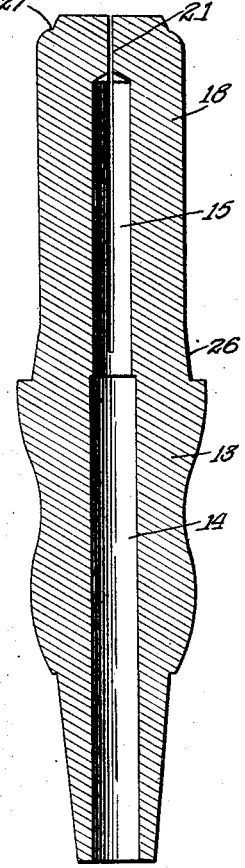
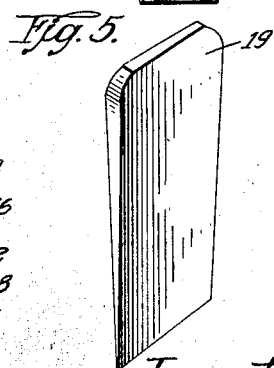
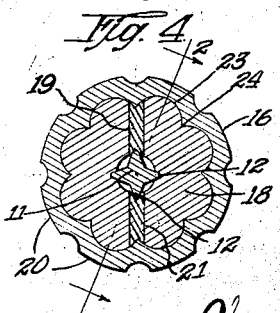
Witness:
Loie Condé.
Inventor:
Clark Waskom
By Wilson & McCanna
Attys.

Patented Feb. 28, 1928.

1,660,537

UNITED STATES PATENT OFFICE.

CLARK WASKOM, OF ROCKFORD, ILLINOIS.

HANDLE FOR SCREW DRIVERS OR SIMILAR TOOLS.

Application filed December 13, 1922. Serial No. 606,559.

This invention relates in general to hand tools, and has more particular reference to screw drivers and similar tools characterized by a handle in which is secured a shank or tang of a blade or the like.

The primary object of my invention is to provide a generally improved tool of this character, which will be exceptionally durable and adapted for the most severe service requirements.

One of the features is the handle construction which is designed to so fixedly secure the shank in the handle as to preclude any possibility of turning or twisting the handle on the shank.

Another feature is the provision of an insulated handle characterized by a body portion of non-conductive material in which the tang is driven and an outer metallic casing shaped in a peculiar and advantageous manner to be brought into wedging engagement with the handle body for insuring a most rigid connection therewith and for reinforcing the connection between the handle body and the tang. In this regard, my invention contemplates the use of a wedge in a novel manner and also the use of internal fluting and shoulders on said casing, as will be more fully described hereinafter.

Still another feature of my invention consists in so shaping the handle body and casing and mounting the shank or tang therein as to withstand exceptionally heavy blows as by a hammer, without injury to the tool.

Another object of my invention is to provide a tool possessing the features and advantages described which may be produced at a comparatively low cost and will serve in a practical manner the purposes intended.

Other objects and attendant advantages will be appreciated by those familiar with this art as the invention becomes better understood by reference to the following description when considered in connection with the accompanying drawings, in which Figure 1 is a view of a screw driver embodying my invention;

Fig. 2 is an enlarged longitudinal, sectional view through the screw driver;

Fig. 3 is a longitudinal sectional view through the handle body before assembly;

Fig. 4 is a cross sectional view taken on the line 4—4 of Fig. 2;

Fig. 5 is a perspective view of the wedge before assembly;

Fig. 6 is a longitudinal sectional view through a screw driver showing a modified form of my invention; and Fig. 7 is a sectional view taken substantially on the line 7—7 of Fig. 6.

While I have in the present application illustrated my invention as applied to a screw driver, it should be understood that it is applicable to any hand tool having a handle in which a shank or tang of a blade or the like is secured.

Referring more particularly to the drawing, it will be observed that the shank 8 of the blade is shaped to provide the usual screw driver end or point 9, and has a tang end 11 fluted or otherwise formed irregular in cross section, preferably to provide radially disposed ribs 12 as plainly shown in Fig. 4.

The handle body designated generally by 13 of some non-conductive material, such for example as wood, is axially bored at 14 for the reception of the shank 8, the bore being reduced in diameter at 15 so that the tang end 11 will have to be forcibly driven into the handle body. The shank will not, however, be driven into the handle body, except in conjunction with the driving of the handle casing thereon, which casing will now be described.

The handle casing designated generally by 16, of any suitable metal or alloy in the form of a tubular body having a semi-spherical end 17, is adapted to be driven over the end 18 of the handle body, and at the same time to force a wedge of any suitable material 19 into the diametrical slot 21 in said handle body. The interior of the handle casing is shaped to provide an annular portion 22, longitudinal fluting characterized by channels or grooves 23, and pointed ribs 24. The grooved portions of the fluting increase in depth from the annular portion 22 to the shoulders 25 at the closed end of the handle casing, and the ribs 24 may be equi-distant throughout their length from the center of the handle casing, but I prefer to incline the points of these ribs in the opposite direction from the inclination of the grooves 23 as plainly shown in Fig. 2, so that these points converge toward the closed end of the handle casing while the grooves diverge. The interior of the closed end of the handle casing may conform substantially to the semispherical shape of its exterior. As shown plainly in Fig. 3, the upper end of the handle body 13 is shaped to provide shoulders 26 and 27 complemental to the portions 22 and 25 on the interior of the handle casing. The outside diameter of the end 18 of said body in its normal condition is such as to tightly enter the narrowest point at the mouth of the handle casing. The closed end of the casing is reinforced by a steel rivet 28, the bolt of the rivet being swaged over a washer 29 on the inner side of the casing end. To assemble the parts above described, the shank will be entered in the opening 14, the wedge 19 will be inserted in the slot 21 and the handle casing 16 will be telescoped over the wedge and the end 18 of the handle body. The handle casing will then be driven downward, thereby forcing the wedge into the slot 21 and spreading or expanding the separated portions of the handle body and at the same time driving said body onto the tang, the latter of which forces its way up through the center of the wedge. The wedge material, it will be understood, is susceptible of compression to an extent to absorb in this way what material is displaced by the tang 19. The said parts are so proportioned that the casing will have to be driven onto the body with considerable force and so that the periphery of the body portion 18 will be forcibly driven into the grooves 23 and the ribs 24. A suitable ferrule 31 is pressed onto the lower end of the body 13 and a pin 32 is passed through said parts and the shank and riveted to further secure the shank in the handle.

As a result of the foregoing, the casing and body will be interlocked circumferentially and substantially throughout the length of the casing, making it practically impossible to turn the casing on the body. Furthermore, the body portion wedged into the casing will be under considerable compression, with the result that the tang 11 will be held under greater pressure and rigidity than if simply driven into a restricted opening in the handle. Another advantage of this construction is that the casing is irremovably locked on the handle body by reason of expansion of the latter, and will not loosen, but instead will become more tightly engaged thereon by driving blows from a hammer. It will also be noted that when blows are driven on the end of the screw driver, the force will be opposed by the casing on the shoulders 26 and 27 and the end of the body 18. However, in order to prevent cracking or checking of the handle body opposite the mouth end of the casing, a resilient packing 30 is interposed to absorb the blows. It will be manifest that the blade is insulated from the handle casing 16, and for this reason the tool is adapted for use in electrical work without danger.

Another feature of my invention is the external shape of the handle casing. As shown in Fig. 1, this casing is fluted and the intermediate portions 20 are knurled to improve the grip. The semi-spherical end 17, however, is finished smooth and its diameter along its base is greater than that of the knurled portion of the casing, with the result that the base portion of said end overreaches the knurled portion of the casing. This smooth over-reaching end is well adapted to fit the palm of the hand and protects the latter from the roughened surface of the knurled portion. This does not, however, interfere with the grip of the finger on the knurled fluted portion. Consequently, a tight grip may be had and considerable pressure applied without injury to the hand.

In Fig. 6, I have shown a modified form of my invention, which is similar to the foregoing as noted by similarity of reference numerals, with the exception of the blade and the manner in which it is secured in the handle. It will be observed that the tang 33 is somewhat fuller in cross section and extends to the top of the body 18, terminating in a reduced end 34. A steel driving cap 35 provided with calks 36 on its underside is fitted onto the head 17 of the handle casing and has an opening through which said end 34 of the tang passes, this end being then riveted to rigidly secure the cap, handle casing and tang together. This construction while not giving an insulated handle is, however, better adapted for screw drivers of larger sizes and will withstand heavy driving blows to better advantage. In fact, a tool of this type may be used as a chisel for cutting off rivets of the same diameter as the shank without injury to the tool. It is also preferred to equip this style of tool with an angular wrench-gripping part 37 suitably fixed to the blade.

It is believed that the foregoing conveys a clear understanding of the objects prefaced above, and it should be understood that while the present description is merely for purpose of illustration, considerable change might be made in details of construction without departing from the spirit and scope of the invention as expressed in the appended claim, in which—

I claim:

A hand tool comprising a handle body of wood slotted longitudinally at one end for the reception of a wedge and bored at the opposite end for the reception of a tang, a metallic handle casing adapted to telescope over the slotted end of the body and being interiorly longitudinally fluted, a blade having a tang adapted to enter said bore and to be forced into the body, and a wedge adapted to enter the slotted end of the body and to be driven into the latter by blows on the end of the casing which also serve to drive the casing onto the body and spread the split portion of the body laterally into the fluted wall of the casing.

CLARK WASKOM.